(12) United States Patent
Lachartre

(10) Patent No.: US 8,988,144 B2
(45) Date of Patent: Mar. 24, 2015

(54) DEMODULATOR AND SYSTEM FOR TRANSMITTING MODULATED INFORMATION, IN PARTICULAR FOR RADIOFREQUENCY IDENTIFICATION TAGS

(75) Inventor: David Lachartre, Montbonnot (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 91 days.

(21) Appl. No.: 13/266,826

(22) PCT Filed: May 4, 2010

(86) PCT No.: PCT/EP2010/056004
§ 371 (c)(1),
(2), (4) Date: Oct. 28, 2011

(87) PCT Pub. No.: WO2010/128030
PCT Pub. Date: Nov. 11, 2010

(65) Prior Publication Data
US 2012/0044017 A1    Feb. 23, 2012

(30) Foreign Application Priority Data
May 7, 2009    (FR) ..................... 09 02226

(51) Int. Cl.
*H04L 27/156* (2006.01)
*H04L 27/233* (2006.01)

(52) U.S. Cl.
CPC ........ *H04L 27/1563* (2013.01); *H04L 27/2331* (2013.01); *H04L 27/2335* (2013.01)
USPC .............. 329/336; 327/158; 327/295; 331/57

(58) Field of Classification Search
USPC ...................... 327/158, 295; 329/336; 331/57
See application file for complete search history.

(56) References Cited

U.S. PATENT DOCUMENTS

| 4,309,673 A | * | 1/1982 | Norberg et al. ............... 332/112 |
| 5,121,070 A | | 6/1992 | Tomita |
| 5,990,733 A | | 11/1999 | Mahany et al. |
| 2003/0099321 A1 | * | 5/2003 | Juan et al. ..................... 375/376 |

(Continued)

FOREIGN PATENT DOCUMENTS

| EP | 0 467 712 B1 | 4/1998 |
| JP | 02-076348 A | 3/1990 |
| JP | 05-048663 | 2/1993 |

OTHER PUBLICATIONS

Refusing Reason Notice mailed Sep. 3, 2013 for corresponding JP Application No. 2012-509006.

Primary Examiner — Joseph Chang
Assistant Examiner — Jeffrey Shin
(74) Attorney, Agent, or Firm — Baker & Hostetler LLP

(57) ABSTRACT

A demodulator including a delay line adapted for receiving an input signal at an input frequency, phase or frequency modulated by symbols with a duration equal to a period of the input signal or very close to that period. The delay line has $N_d$ outputs producing $N_d$ signals at the input frequency but with $N_d$ different delays offset by $\Delta T$ relative to one another, $N_d$ being an integer number greater than or equal to 1. The demodulator also includes a register of $N_d$ latches each receiving a respective output of the delay line and a clock signal which is the input signal, in order to store the state of the outputs of the delay lines at the end of a period of the clock signal in the register. The content of the register represents a value of an input signal modulation symbol.

17 Claims, 9 Drawing Sheets

(56) References Cited

U.S. PATENT DOCUMENTS

| | | | |
|---|---|---|---|
| 2004/0008755 A1* | 1/2004 | Byun et al. ................ 375/130 |
| 2009/0045871 A1 | 2/2009 | Masson et al. |
| 2009/0153206 A1* | 6/2009 | Kim et al. ................ 327/158 |
| 2010/0231315 A1* | 9/2010 | Sun ................ 332/144 |

* cited by examiner

DEMODULATOR AND SYSTEM FOR TRANSMITTING MODULATED INFORMATION, IN PARTICULAR FOR RADIOFREQUENCY IDENTIFICATION TAGS

CROSS-REFERENCE TO RELATED APPLICATIONS

This application is a National Stage of International patent application PCT/EP2010/056004, filed on May 4, 2010, which claims priority to foreign French patent application No. FR 09 02226, filed on May 7, 2009, the disclosures of each of which are incorporated by reference in their entireties.

FIELD OF THE DISCLOSED SUBJECT MATTER

The invention relates to wireless communications and notably the near-field communication systems of RFID (Radio Frequency IDentification type).

BACKGROUND

The RFID systems enable data to be transmitted over a very short distance (from a few centimeters to a few meters, or, exceptionally, more) between a reader and a tag of small dimensions. The reader sends a signal at a radiofrequency which transports energy and information (for example, an interrogation) to the tag. The tag is activated by the energy received and it transmits to the reader information in response to the received information or interrogation. The information may be a simple numerical identification of the tag and therefore, indirectly, of the object to which the tag is affixed. The tag includes a radio antenna which makes it possible to receive the signal at the frequency sent by the reader and which makes it possible to send back a radio signal modulated by the information to be transmitted to the reader in return. The modulation is done in the tag which may include, for this purpose, an integrated circuit chip. The tags are sometimes provided with a battery to handle auxiliary functions, but more often than not, when their function is primarily an identification function, they are entirely powered by the radiofrequency energy received from the reader.

The modulation performed by the reader is more often than not an amplitude modulation of a carrier frequency, but efforts are now also being made to do a frequency or phase modulation, allowing for higher information bit rates. The modulation performed by the tag may be a load modulation, that is to say, a modulation of the impedance of the antenna, this modulation reacting on the impedance of the sending/receiving antenna of the reader. The interest here is mainly focused on the modulation done by the reader and on the demodulation done by the tag.

When the modulation by the reader is a frequency or phase modulation of a signal with a central carrier frequency $F_0$, it is essential to be able to demodulate the information in the tag and, for this, it is essential to have a signal at the same central frequency $F_0$ in the tag. In the usual radiocommunication systems operating in frequency or phase modulation mode, the receiver generally has a local frequency generator aligned on the central frequency of the radiofrequency signal that is to be demodulated. The local generator produces the demodulation by frequency transposition to an intermediate frequency or to the baseband. The demodulators can also use a phase-locked loop receiving the signal from a local voltage-controlled oscillator (VCO) and aligning the frequency of this signal on the received frequency. With modulations of a very particular type, it is sometimes possible to dispense with a local oscillator, but this is not possible in the general case.

Now, in an RFID tag, there is not a lot of space for this frequency generator or this local oscillator and there is not a lot of energy available to operate it. A controlled-frequency local oscillator or a standalone frequency generator based on an integrated circuit chip generally require components external to the chip and it is not desirable to have such external components in the tag, for bulk reasons.

SUMMARY

The aim of the invention is therefore to propose a system for transmitting information and a corresponding electronic demodulation circuit, particularly suited to communication between a reader and an RFID tag. The system can send in frequency or phase modulation phase, without the need for a local frequency generator in the demodulator, and without external components which would be added to a single integrated circuit chip present in the tag.

In the transmission system according to the invention, provision is first of all made for the modulation to modify the frequency or the phase of the carrier for durations which are variable but which remain related to the period of the received radiofrequency signal. The information consists of a succession of adjacent "symbols" each represented by a specific frequency or phase and the symbols are detected by measuring a duration which is related to this frequency or this phase; each possible symbol lasts, for example, $N_s$ periods, $N_s$ being a fixed integer number which is the same for all the symbols, but the frequency (in frequency modulation mode) or the phase (in phase modulation mode) vary according to the symbol. The demodulation consists in determining the duration of a group of $N_s$ periods, in order to deduce the frequency or the phase of the modulation therefrom, and therefore the value of the symbol corresponding to this group of $N_s$ periods.

In frequency modulation mode, the duration of the symbol will preferably be exactly equal to $N_s$ periods of the modulated signal F. In phase modulation mode, the duration of the symbol will preferably also be equal to $N_s$ periods of the phase modulated carrier frequency $F_0$, this duration depending on the phase, such that the overall duration of the symbol will vary according to the modulation. In a possible variant, applicable provided that the frequency modulation index $(F_{min}-F_{max})/F_0$ around the central frequency $F_0$ is sufficiently low, the duration of the symbol can be constant but equal to or very close to $N_s$ periods of the signal at the central frequency $F_0$, and the demodulation will once again consist in observing the duration of $N_s$ periods of the modulated signal.

This type of modulation can be demodulated by a demodulator according to the invention which does not require any local clock at the central frequency $F_0$. The demodulator comprises a delay line suitable for receiving an input signal at an input frequency, phase or frequency modulated by symbols with a duration equal to a period of the input signal or very close to that period, the delay line having $N_d$ outputs producing $N_d$ signals at the frequency of the input signal but with $N_d$ different delays, $N_d$ being an integer number greater than or equal to 1, the demodulator also comprising a register of $N_d$ latches each receiving on the one hand a respective output of the delay line and on the other hand a clock signal consisting of the input signal, in order to store the state of the outputs of the delay line at the end of a period of the input signal in the latch register, the content of the register representing a value of an input signal modulation symbol.

The delay line may be a line with fixed delays. However, it is preferable for it to be controlled by a locked loop with long time constant (given the duration of the symbols) so that the delay increments established on the different outputs of the line remain stable from one symbol to the next but are adjusted on average in the long term to a value linked to the average frequency of the input signal. This locking will be explained in more detail hereinbelow. The locked loop then preferably comprises a phase comparator receiving on the one hand the input signal at the input frequency and on the other hand one of the outputs of the delay line, and an integrator with time constant very much greater than the duration of the symbols, the output of the integrator controlling the duration of the delay increments established by the line in order to lock them according to the average value of the input frequency.

The demodulator preferably comprises, upstream of the delay line, a frequency divider dividing the frequency by an integer number $N_s$; this divider is suitable for receiving a signal at a phase or frequency modulated radiofrequency and for supplying the input of the delay line with the input signal at the modulated input frequency $N_s$ times lower than the radiofrequency.

The demodulator according to the invention can be used in a transmission system comprising a reader and a tag, in which the reader sends in frequency or phase modulation mode and in which the symbols are sent either synchronously (that is to say, with a duration representing a fixed number of periods of the modulated radio signal) or asynchronously (with fixed durations, preferably representing a fixed number of periods of the signal at the unmodulated central frequency).

BRIEF DESCRIPTION OF THE DRAWINGS

Other features and advantages of the invention will become apparent on reading the following detailed description which is given with reference to the appended drawings in which.

DETAILED DESCRIPTION

Figure 1:
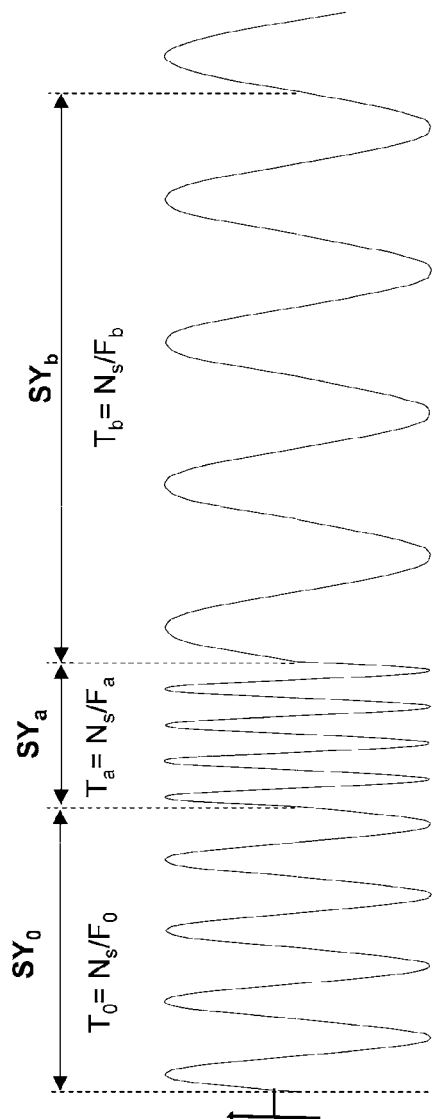
FIG. 1 represents an exemplary signal at radiofrequency, frequency modulated by symbols of variable durations which are a fixed multiple of the duration of the period of the modulated signal.

FIG. 1 shows a radiofrequency signal consisting of a central radiofrequency frequency-modulated by successive symbols of different values, respectively designated $SY_0$, $SY_a$, $SY_b$. The value of a symbol is defined by a respective frequency F ($F=F_0, F_a, F_b \ldots$) assigned to this symbol. FIG. 1 shows the unmodulated basic frequency, as well as a higher modulated frequency $F_a$ and a lower modulated frequency $F_b$, the respective frequency F being sent by a reader 102 adapted for sending a frequency or phase modulated radiofrequency signal.

The modulation duration, during which each signal is sent, is linked to the period of the radiofrequency signal.

In the simplest case, which is represented in FIG. 1, the duration of a symbol is equal to a fixed number of periods of the signal, preferably an integer number $N_s$. The value of the symbol is therefore represented not only by the value of the frequency of the signal sent but also by a respective duration of the symbol, this duration being $T=N_s/F$, that is to say $T_0=N_s/F_0$, $T_a=N_s/F_a$, $T_b=N_s/F_b$, etc. In the example of FIG. 1, $N_s=4$ and the frequency variations have been deliberately exaggerated to give a better understanding of the principles.

In this simple case, the duration of the symbol is exactly equal to $N_s$ periods and the $N_s$ periods have durations that are all identical; the demodulation will consist in using a delay line to measure the duration of the symbols which is exactly the duration of $N_s$ identical periods. It will be seen later that the invention is also applicable in the case of a phase modulation in which the duration of the symbol is equal to $N_s$ periods of the modulated signal, this duration depending on the phase, in the case of an asynchronous modulation in which the durations of the symbols are all identical to a common value $T_0$ which is preferably equal to $N_s$ periods of the average frequency $F_0$ of the radio signal.

In all cases, the modulation is done so that the duration of the symbols represents an integer number $N_s$ of periods of the radiofrequency signal, whether this is exactly $N_s$ periods of the modulated signal ($N_s$ identical periods of duration 1/F or $N_s$ periods not necessarily identical but for which the sum of the durations depends on the phase), or else $N_s$ periods of the average frequency $F_0$. In all cases, the duration of $N_s$ periods of the modulated signal is measured.

Figure 2:
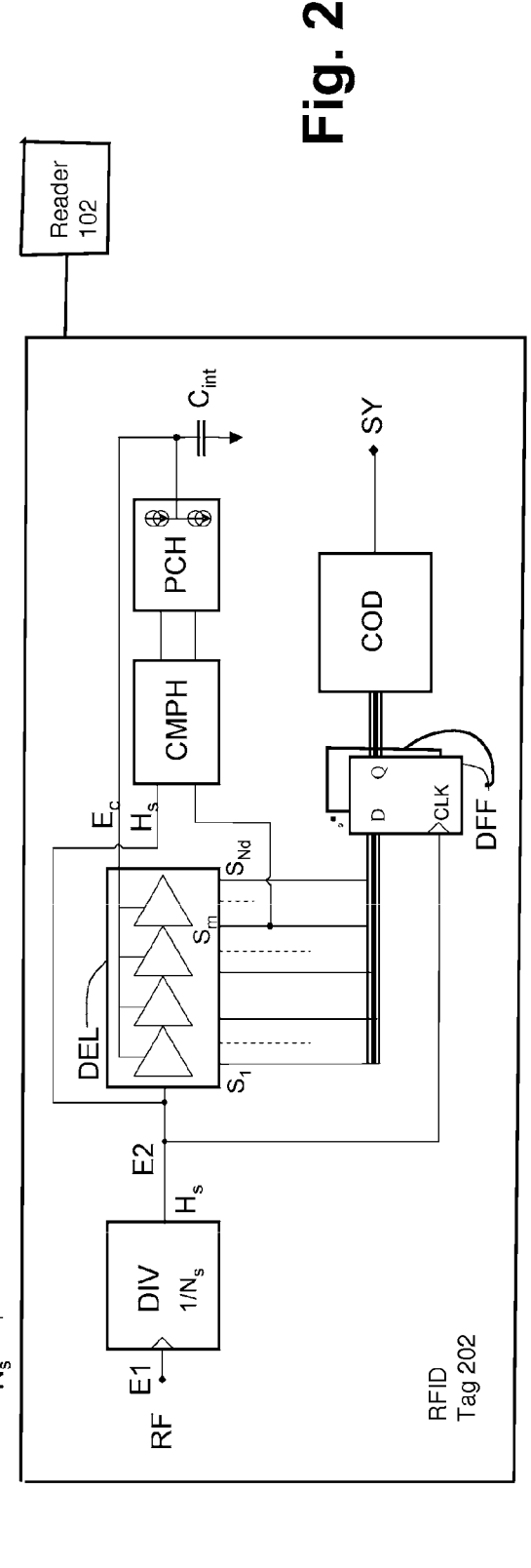
FIG. 2 represents the structure of a demodulator according to the invention.

FIG. 2 represents an embodiment of a demodulator according to the invention for demodulating a signal modulated in one of these different ways. It includes an input E1 receiving the radiofrequency RF to be demodulated, obtained from an antenna (not represented) of a tag 202. The input E1 is linked to the input of the frequency divider DIV (in practice, a counter) which divides the frequency F of the received signal by the number $N_s$ and which produces on its output an alternative signal $H_s$, called input signal, with a period equal to $N_s/F$. The counter-divider is optional: its presence depends on the modulation expected; if the modulation is done so that the duration of the symbols represents $N_s$ periods, $N_s>1$, of the radiofrequency signal (exactly or approximately, as explained above), a divider by $N_s$ is necessary; however, $N_s$ can, at the limit, be equal to 1, the modulation being done on each new period of the radiofrequency signal, and in this case, there is no need for a divider.

The core of the demodulator according to the invention is therefore situated after the divider. The input of the core of the demodulator is an input E2 linked to the output of the divider, and this input receives a signal $H_s$, the frequency of which is the frequency F divided by $N_s$.

The input E2 is the input of a delay line DEL having a number $N_d$ of outputs $S_1$ to $S_{Nd}$, each output $S_i$ supplying a signal of the same period as the input signal $H_s$ but with a respective delay $D_i$, in which i is an index representing the rank of the output of the link. The delays $D_i$ of the $N_d$ outputs are phased regularly at intervals $\Delta T$ between a minimum value and a maximum value.

The delay line could be a line producing fixed delays phased by a fixed value ΔT. However, it is preferable for the value of the basic delay ΔT to be locked onto the average frequency $F_0$ of the signal received by the demodulator. In practice, the value ΔT will be used to measure deviations between signal period durations close to the received average frequency and it is desirable for there to be a direct link between the received average frequency and the value of the delay which is used in measuring the deviations.

This is why FIG. 2 represents a demodulator which is provided with such a locking arrangement. The locking is produced by a phase-locked loop which comprises a phase comparator CMPH and an integrator with long time constant compared to the duration of the symbols to be demodulated (preferably, the time constant is at least several hundred times the duration of a symbol).

The phase comparator receives, on the one hand, the input signal at the input frequency $H_s$ and, on the other hand, a signal from one of the outputs (output $S_m$) of the delay line. The output $S_m$ supplies the signal $H_s$ with a reference delay $D_m$ such that, for the average modulation frequency $F_0/N_s$, the rising edges of the signal on the output $S_m$ are in phase (this could be in phase opposition, depending on the construction of the phase comparator) with the rising edges of the non-delayed signal $H_s$.

The phase-locked loop acts on the delay line by adjusting the basic delay ΔT in a direction tending to keep the output $S_m$ in phase with the input E2 (therefore a zero phase-shift between the inputs of the phase comparator). The high time constant of the loop makes it possible for this phase alignment to be done for an average frequency $F_0$ of the radio signal. Because of this, the delay duration ΔT can be considered as fixed from one symbol to the next.

The integrator placed at the output of the phase comparator is constructed, for example, using a charge pump PCH and an integrator (capacitor $C_{int}$). The integrated voltage at the terminals of the capacitor $C_{int}$ is applied to the control input $E_c$ of the delay line; the voltage on this input acts on the value of the basic delay ΔT and therefore on all the delays established by the line. Because of the integration of the phase-shift information supplied by the phase comparator CMPH, the voltage at the terminals of the integration capacitor is stabilized at a value such that the average phase shift between the signal $H_s$ and the output signal on $S_m$ is zero (or constant).

The $N_d$ outputs of the delay line are applied to the inputs of a register DFF with multiple latches D. Each latch D receives on its input D a respective output out of the $N_d$ outputs, and receives on a clock input CLK the input signal $H_s$ at the frequency $F/N_s$. On the rising edge (for example) of the signal $H_s$, the latches each take the state imposed on their respective input D. This state depends on the instant of arrival of a second rising edge of $H_s$ after a first rising edge which has been delayed differently on each of the outputs. The first rising edge is the one that defines a symbol start. The second is the one that defines a symbol end (and the start of a new symbol). At the end of the symbol, the set of $N_d$ outputs of the latch register defines, according to a thermometric-type code, a value which represents the symbol that has just ended.

A coding circuit COD placed at the output of the latch register makes it possible to supply the value of the symbol in a form other than thermometric, for example according to a binary code. The successive symbols arrive on the output SY in step with the arrival of the rising edges of $H_s$.

Figure 3:
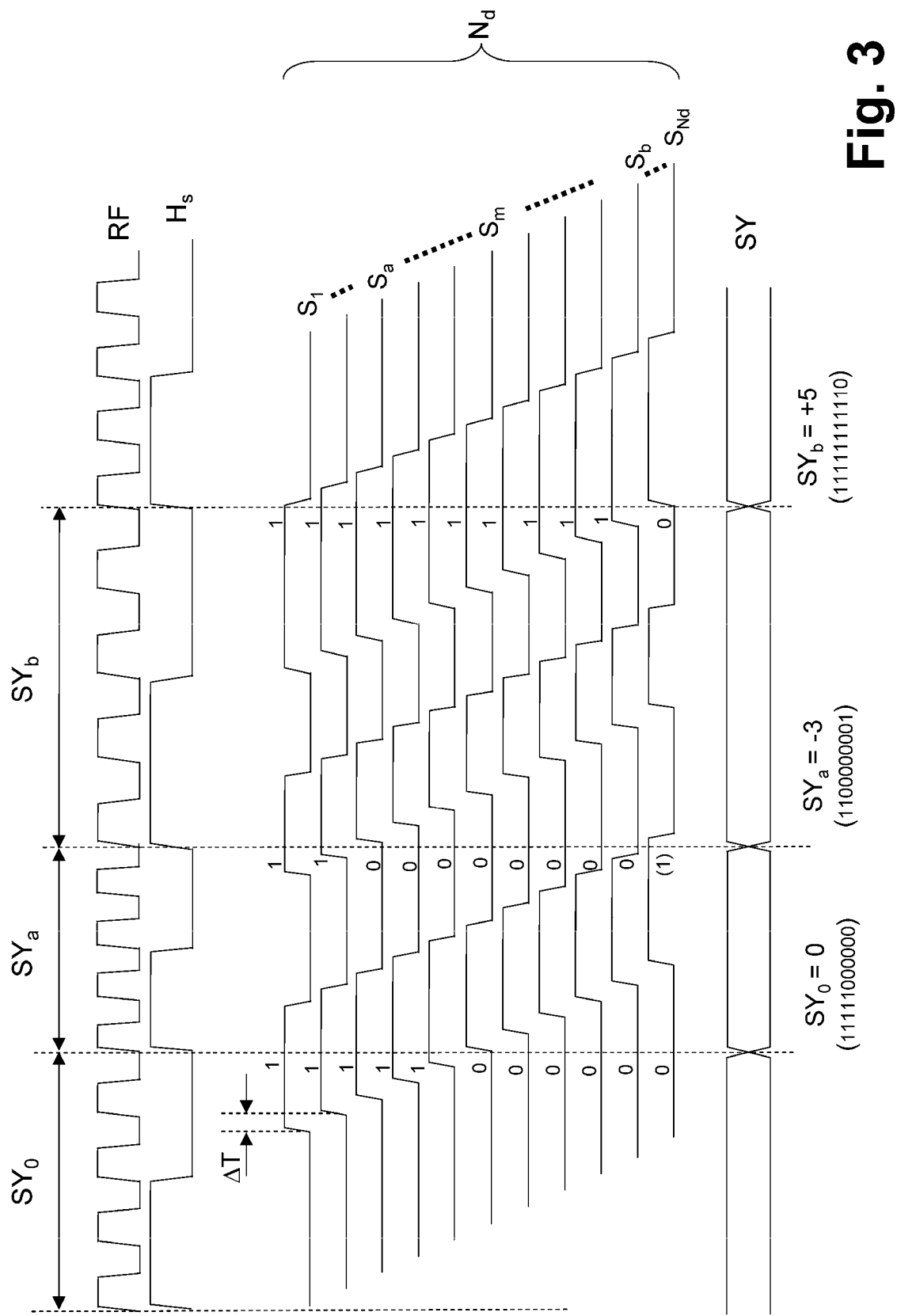
FIG. 3 represents a timing diagram explaining the principle of the demodulation performed, in the case of reception of a signal frequency modulated by symbols with a duration that is a multiple of the period of this signal.

FIG. 3 represents a timing diagram explaining the demodulation in an example in which the modulation of the received signal is a frequency modulation and in which each symbol has a duration exactly equal to $N_s$ periods (in FIG. 3, $N_s=4$) of the radio signal RF received at the input E1 of the demodulator. Three successive symbols $SY_0$, $SY_a$, $SY_b$ are represented, respectively corresponding to three different frequency values $F_0$, $F_a$, $F_b$ and therefore to three different durations. It is assumed here that the frequency $F_0$ is the central frequency around which the modulation is performed, and that this frequency $F_0$ is the average frequency of the modulated signal; the frequency $F_a$ is greater than $F_0$ and the frequency $F_b$ is lower than $F_0$. A symbol $SY_0$ is assigned in this example to the average frequency $F_0$ but this is not mandatory.

The first line of FIG. 3 represents the radiofrequency signal RF received at the input E1 of the demodulator and having a variable frequency F. The second line represents the signal $H_s$ at the output of the counter-divider DIV, therefore at the input E2 of what was previously called the core of the demodulator. The signal $H_s$ has a frequency which is the frequency $F/N_s$. The next $N_d$ lines of FIG. 3, referenced $S_1$ to $S_{Nd}$, represent $N_d$ signals at the frequency $F/N_s$ delayed by the delay line DEL and present on the $N_d$ outputs $S_1$ to $S_{Nd}$ of this delay line.

The greater the number of outputs $N_d$ (and the smaller the delay increment ΔT between two successive outputs), the more accurate the demodulator.

One of the outputs, $S_m$, of the delay line has a particular role since it serves as a reference for the phase-locked loop. The output $S_m$ is preferably the one that establishes a delay of an entire period of the signal $H_s$ when the input frequency is $F_0$. This is the simplest solution for aligning the phase-locked loop on a basic delay which is defined relative to the average frequency of the frequency-modulated signal. The basic delay increment ΔT between the successive outputs of the delay line can be considered to be fixed because of the phase-locked loop with long time constant.

It can be seen in FIG. 3 that the delayed signal from the output $S_m$ has rising edges which coincide with the rising edges of the signal $H_s$ when the latter is at the frequency $F_0/N_s$, therefore while the $SY_0$ is being sent. It would also be possible to envisage the rising edges of the signal from the output $S_m$ coinciding with the falling edges of the signal $H_s$ by modifying the construction of the phase comparator CMPH accordingly.

At the end of the symbol $SY_0$, on the rising edge of the signal $H_s$, the logic states of the outputs $S_1$ to $S_{m-1}$ which precede the output $S_m$ are in a first logic state (here: high level 1), whereas the outputs $S_m$ to $S_{Nd}$ are in a second logic state (here: low level 0). The state of all the outputs taken in order is: 11111000000.

The next symbol $SY_a$ corresponds to a higher frequency. At the end of the symbol $SY_a$, on the rising edge of the signal $H_s$, the state of the first outputs of the delay line, before an output $S_a$, is at the level 1, and the state of the last outputs from $S_a$ (apart from the output $S_{Nd}$) is at the level 0. The state of all the outputs taken in order is in this example 110000000 (1). The final 1 has no purpose.

Finally, the symbol $SY_b$ corresponds to a lower frequency than $F_0$ and the state of the outputs of the delay line at the moment of the rising edge of the signal $H_s$ at the end of the symbol $SY_b$ is 111111111110, that is to say 1 before an output $S_b$ and 0 from the output $S_b$ to the output $S_{Nd}$.

The position of the transition from the 1 state to the 0 state in the direction of the increasing delays therefore directly represents the deviation between the lengths of the symbols, the code 11111000000 representing the symbol $SY_0$, that is to say the average frequency $F_0$, the code 11000000xx representing a symbol $SY_a$ (lower frequency) and the code 11111111110 representing a symbol $SY_b$ (higher frequency).

The overall state of the outputs therefore defines the symbols, according to a thermometric code, that is to say a code in which the value is defined by the position of a transition from a series of 1 states to a series of 0 states.

The register DFF of $N_d$ latches D stores this code at the moment of the end of a symbol (defined by the rising edge of the signal $H_s$), and the coder COD converts the code into pure binary (for example) to supply, on the output SY, a symbol value which has just been demodulated.

In the example represented, it is assumed that the values of the symbols are incremented or decremented by one unit each time the duration of the symbol is incremented or decremented by a value $\Delta T$, the symbol $SY_0$ having a value 0, the symbol $SY_a$ has a value $-3$ and the symbol $SY_b$ has a value $+5$. It will be understood that, if the modulation is done such that a symbol value increment in the succession of the possible symbols corresponds to a delay increment $2\Delta T$, the coder COD must take account of this to determine the value of the symbol from the thermometric code.

For the demodulator to function in the best conditions, it is desirable for the divider DIV (when it is present) to be correctly synchronized on the start of a symbol. It then includes a synchronization input (not represented). The synchronization can be sought on the repeated sending of initialization code before the start of a true transmission of information. This point will be returned to later.

Figure 4:
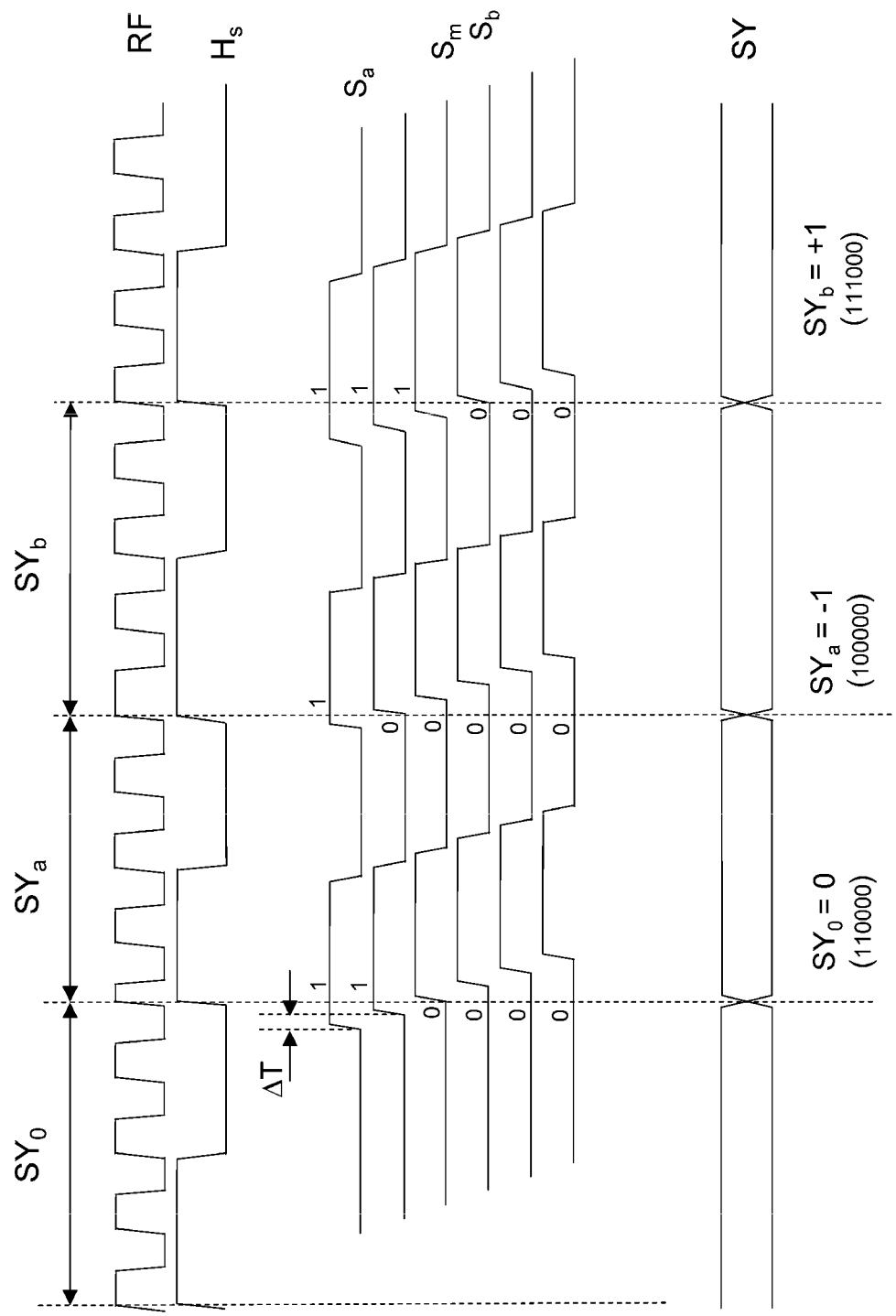
FIG. 4 represents a timing diagram explaining the principle of the demodulation in the case of the reception of a phase-modulated signal.

FIG. 4 represents an example of operation of the demodulator according to the invention in the case where the radiofrequency signal is phase modulated. It is then considered that the duration of a symbol is $N_s$ periods of the radiofrequency signal. The overall duration of the $N_s$ periods is such that the end of the symbol is phase shifted by a determined phase relative to the clock frequency which is not phase modulated. For example, it is possible to consider that the first period has a duration $T=(1+\Phi/2\pi)/F_0$, in which $F_0$ is the carrier frequency of the radio signal and $\Phi$ is the phase used to modulate this signal. $\Phi$ is equal to zero (for example) for the symbol $SY_0$ and equal to $\Phi_a$ or $\Phi_b$ for the symbols $SY_a$ and $SY_b$. The following periods have a duration $1/F_0$. In the example represented, $\Phi_a$ is negative (resulting in a first period of the symbol that is shorter than the others) and $\Phi_b$ is positive (resulting in a longer first period). It is this example of phase modulation which is represented in FIG. 4.

The signal $H_s$ has rising edges synchronous with the rising edges of the radio signal at the symbol start and symbol end.

The duration that separates the rising edge of $H_s$ at the symbol start and the rising edge at the symbol end is once again measured by the state of the $N_d$ delayed outputs of the delay line at the moment of the rising edge which defines the end of the symbol. The output $S_m$ is the one that supplies a signal delayed by an entire period when the phase modulation $\Phi$ is zero.

The state of the outputs of the latch register also defines a thermometric code which represents the duration of the period of the signal $H_s$ and therefore the value of the symbol since this duration is directly linked to the phase.

It will be noted that the phase modulation consists in establishing a phase shift relative to an absolute time reference which is defined by the unmodulated carrier; since the demodulator measures a duration of $N_s$ periods relative to the end of the preceding symbol, the thermometric code obtained at the output will represent a symbol variation relative to the preceding symbol rather than the actual modulation symbol. Consequently, the true symbol that was used to modulate the phase would be obtained by adding the detected variation to the value of the preceding symbol. An addition register (not represented) will be added for this purpose at the output of the demodulator. Error correction mechanisms will then be adopted, for safety, to avoid any demodulation error on a symbol from being propagated to all the following symbols.

FIG. 2 and FIG. 3 illustrate the case of a frequency modulation and of a phase modulation in which the sending duration of a symbol was exactly $N_s$ entire periods of the signal at the radiofrequency at the instant of the symbol, the duration of the first period taking into account the value of the phase in the case of the phase modulation. In these two cases, the modulation is a so-called synchronous modulation in as much as the instant of the start of a symbol and of the end of a symbol is aligned relative to the radiofrequency. The duration of the symbols was therefore variable from one symbol to another.

However, the demodulator can also operate in the case where the received signal is modulated asynchronously, with a fixed symbol duration. This is particularly true in the case where the signal is phase modulated but it may also be the case in frequency modulation provided, however, that the modulation rate of the signal at the radiofrequency is relatively low.

Figure 5:
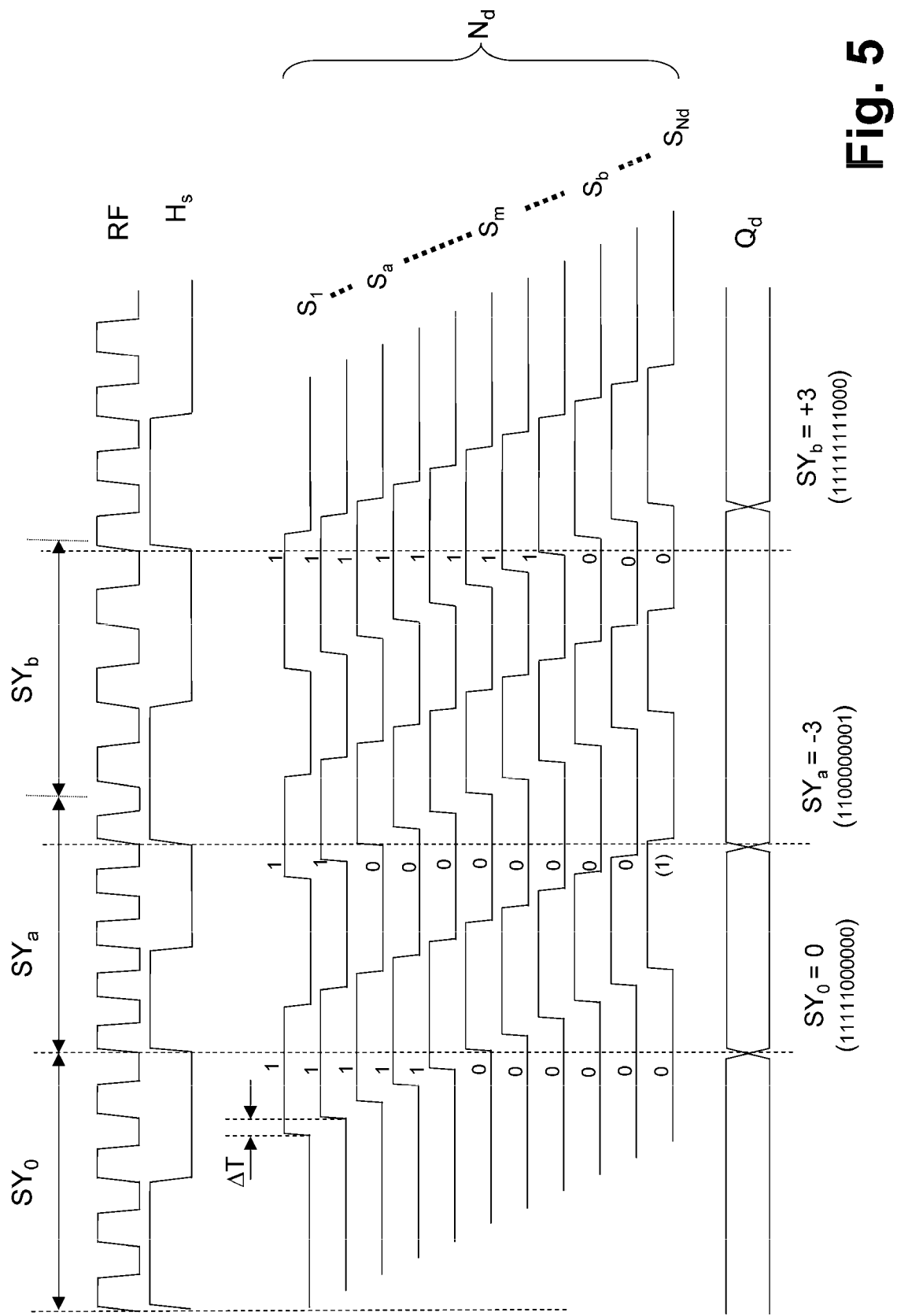
FIG. 5 represents a timing diagram explaining the principle of the demodulation in the case of the reception of a signal frequency modulated by successive symbols of fixed duration.

FIG. 5 illustrates the demodulation in the latter case. The duration of a symbol is that during which the frequency is modified and takes the value defined for this symbol. However, the delay measurement remains defined by the frequency $H_s$, that is to say, namely by a duration linked to $N_s/F$ and it is indeed this duration that has to be measured in order to work back to the frequency and therefore the value of the symbol.

This is why it is always the rising edges of $H_s$ ($=N_s/F$) (or always the falling edges) that register in the latches the state of the outputs of the delay line. There is therefore, in the case of the asynchronous modulation by symbols of constant duration, a time offset between the end of the symbol and the instant at which the latches toggle.

The duration of the symbols is preferably taken to be equal to $N_s$ periods at the average frequency $F_0$. The symbols $SY_0$ therefore have a duration exactly equal to $N_s/F_0$, but the symbols $SY_a$ and $SY_b$, which have the same duration, are a little longer than $N_s/F$, for one of them and a little shorter than $N_s/F_b$ for the other. However, if the frequency variations are low and evenly distributed, the measurement instant error which results therefrom (relative to the symbol end instant) may be less than the duration of a basic delay $\Delta T$ of the delay line, and in this case there is no symbol determination error.

It will be noted that the risk of error in the case of an asynchronous modulation with symbols of constant duration becomes all the lower when $N_s$ becomes greater (and, in the case of a frequency modulation, the modulation index becomes lower).

Regardless of the type of modulation, whether synchronous or asynchronous, frequency or phase, the demodulator supplies, at the output of the register of $N_d$ latches (in the case where $N_d$ is greater than 1), a thermometric code in which the value of the demodulated symbol is defined by the position of the transition from a continuous series of logic 0 states to a continuous series of logic 1 states. This particular feature makes it possible, if desired, to establish a detection of demodulation errors: if an absence of transition from a series of 1 states to a series of 0 states is detected, or else if a number of transitions of this type are detected, the demodulated symbol will be considered to be errored and rejected.

The figures which follow are given only as illustrative examples showing how it is possible to implement the frequency divider, the delay line, the phase comparator and the integrator of the demodulator of FIG. 2.

Figure 6:
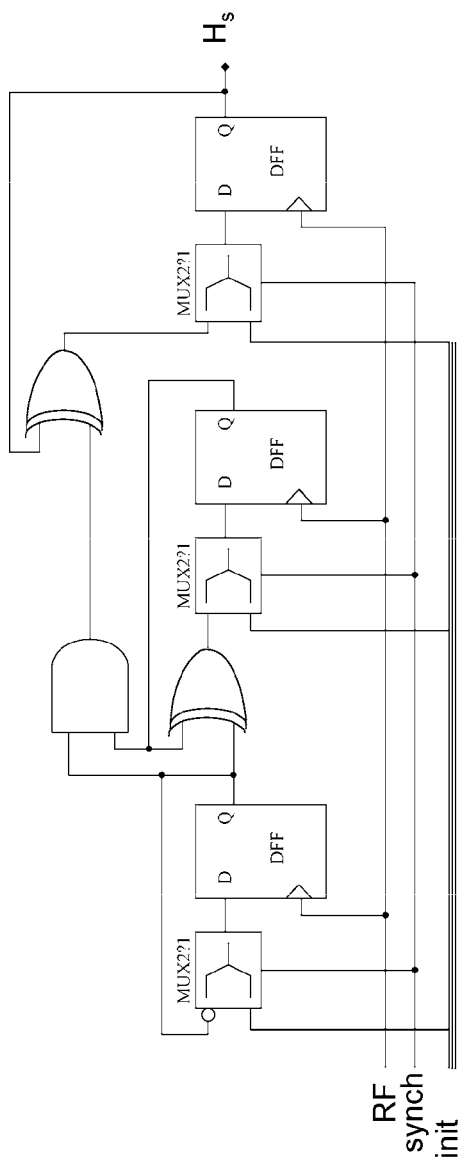
FIG. 6 represents an exemplary divider by $N_s$.

FIG. 6 represents an exemplary frequency divider for dividing the frequency by $N_s$ in the case where $N_s=8$. This is only an example, there are many known solutions for producing a frequency divider.

The divider is a counter: it comprises three D latches which form a three-bit counter; the clock input of these three latches receives the signal at the radiofrequency RF obtained, for example, from the antenna of the RFID tag 202. The input D of each latch receives the output of a respective multiplexer MUX1, MUX2, MUX3. The multiplexers are used to ensure the initialization of the counter with a determined value (between 0 and 7) during a synchronization phase, then they ensure the necessary loopbacks between the latch outputs and inputs. These loopbacks establish the necessary frequency divisions; thus, the first latch divides the RF frequency by two because its input D originates from its output; the second latch divides the frequency by four because its input receives its output through an exclusive-OR gate controlled by the first latch; and the third latch divides the frequency by eight because its input receives its output only through an exclusive-OR gate controlled by the other two latches.

A synchronization input and an initialization bus are provided. The synchronization input "synch" controls the multiplexers to apply to the latches, during the synchronization, logic states corresponding to an initialization value (from 0 to 7).

The synchronization can be performed in several ways, and notably by sending a synchronization code at the head of a symbol frame, or sending a specific modulated symbol, or an amplitude modulation of a synchronization pulse.

In the case of a synchronization by a code at the start of a frame, provision is made for the header to contain a code of length $N_c$ (number of symbols $N_c$) repeated at least $N_s$ times.

A small state machine, not represented, will generate in the demodulator $N_s$ times a synchronization pulse every $N_c$ periods of the signal at the RF frequency. At each pulse, the initialization value applied to the counter formed by the three latches is incremented by one unit, until the $N_s$ possible initialization values have been produced. The demodulator produces $N_c$ different codes because the initialization is different each time. One of these codes will be identical to an expected initialization code and the detection of the expected code will stop the counter synchronization process, the latter continuing to perform the division by $N_s$ from the synchronized state detected.

The synchronization can alternatively be done with a specific symbol not used in the data transmission, rather than with a specific code of $N_c$ symbols. The principle is the same as previously, with a succession of $N_s$ different initializations until the demodulator finds the specific symbol.

Finally, it is also possible to envisage having the transmitter modulate a synchronization pulse in amplitude, but then the demodulator must be provided with amplitude demodulation means.

Figure 7:
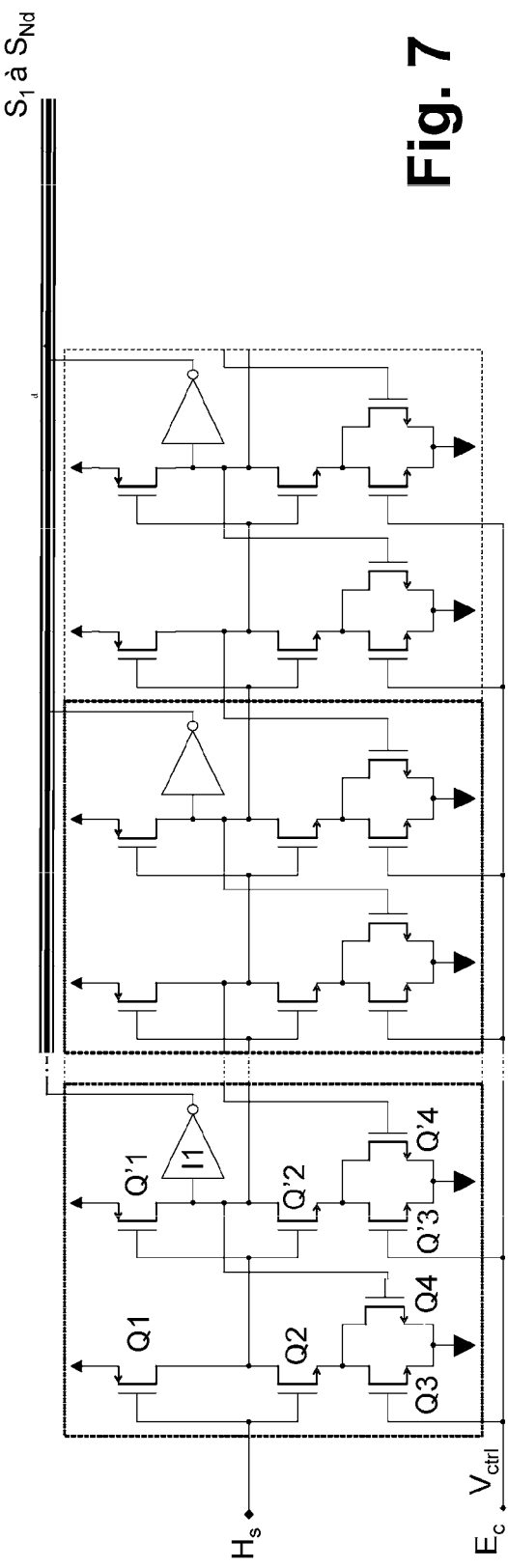
FIG. 7 represents an exemplary digital delay line.

FIG. 7 represents an example of the construction of a logic delay line that can be used in the demodulator according to the invention. It has an input E2 for receiving the signal $H_s$ and $N_d$ outputs $S_1$ to $S_{Nd}$ supplying a logic signal that has the same rising edges as the signal $H_s$, but delayed relative to this signal. An intermediate output (the output $S_m$ mentioned previously) supplies a delayed signal whose edge coincides with an edge of the signal $H_s$. The other outputs supply delayed signals offset relative to one another by increments $\Delta T$. The line includes $N_d$ cascaded identical stages each formed by a pair of inverting cells; each stage propagates, from its input to its output, the signal that it receives from the preceding stage while delaying it by $\Delta T$.

A cell is formed by a PMOS transistor Q1 and a series NMOS transistor Q2, commoned by their drain and having their gates commoned, an NMOS supply transistor Q3 in series with the pair Q1, Q2, this transistor having its gate controlled by a DC voltage $V_{ctrl}$ present on the control input $E_c$ of the delay line. Another pair of transistors Q'1, Q'2 is mounted like the pair Q1, Q2, with a supply transistor Q'3 mounted like Q3. The pair Q1, Q2 acts as a first inverter and the pair Q'1, Q'2 as a second inverter and the output of this second inverter is linked to the input of the next stage of the delay line. An output inverter I1 has its input connected to the commoned drains of Q'1 and Q'2 and its output constitutes a respective output of the delay line out of the $N_d$ outputs.

The delay increment $\Delta T$ between two outputs of the line is the sum of the toggling delay of the first inverter (Q1, Q2) and of the second inverter Q'1, Q'2.

The delay increment $\Delta T$ is adjusted by varying the control voltage $V_{ctrl}$ of the transistors Q3 and Q'3; this voltage originates (see FIG. 2) from the phase-locked loop (in practice: from the integration capacitor $C_{int}$), which ensures an automatic adjustment of the delay increment. The higher $V_{ctrl}$, the higher the discharge current of the capacitive node at the output of a pair of transistors such as Q1, Q2 or Q'1, Q'2 and the faster the discharging of the capacitive node consisting of the drains of these pairs; the toggling level of the next pair of transistors (of the same stage or of the next stage) is achieved more quickly and therefore the delay produced by the stage is smaller. Conversely, the more $V_{ctrl}$ decreases, the slower the discharging becomes and the more the delay increases.

Preferably, there is provided, in parallel with each supply transistor (Q3, Q'3), a feedback transistor (Q4, Q'4) whose gate is controlled by the next pair of cells (of the same stage if it is the transistor Q4 in parallel with Q3, or of the next stage if it is the transistor Q'4 in parallel with Q'3). This transistor very quickly discharges the output node of a pair of cells after the next cell has toggled, and this makes it possible to have steeper transition edges when this output node switches to zero.

Figure 8:
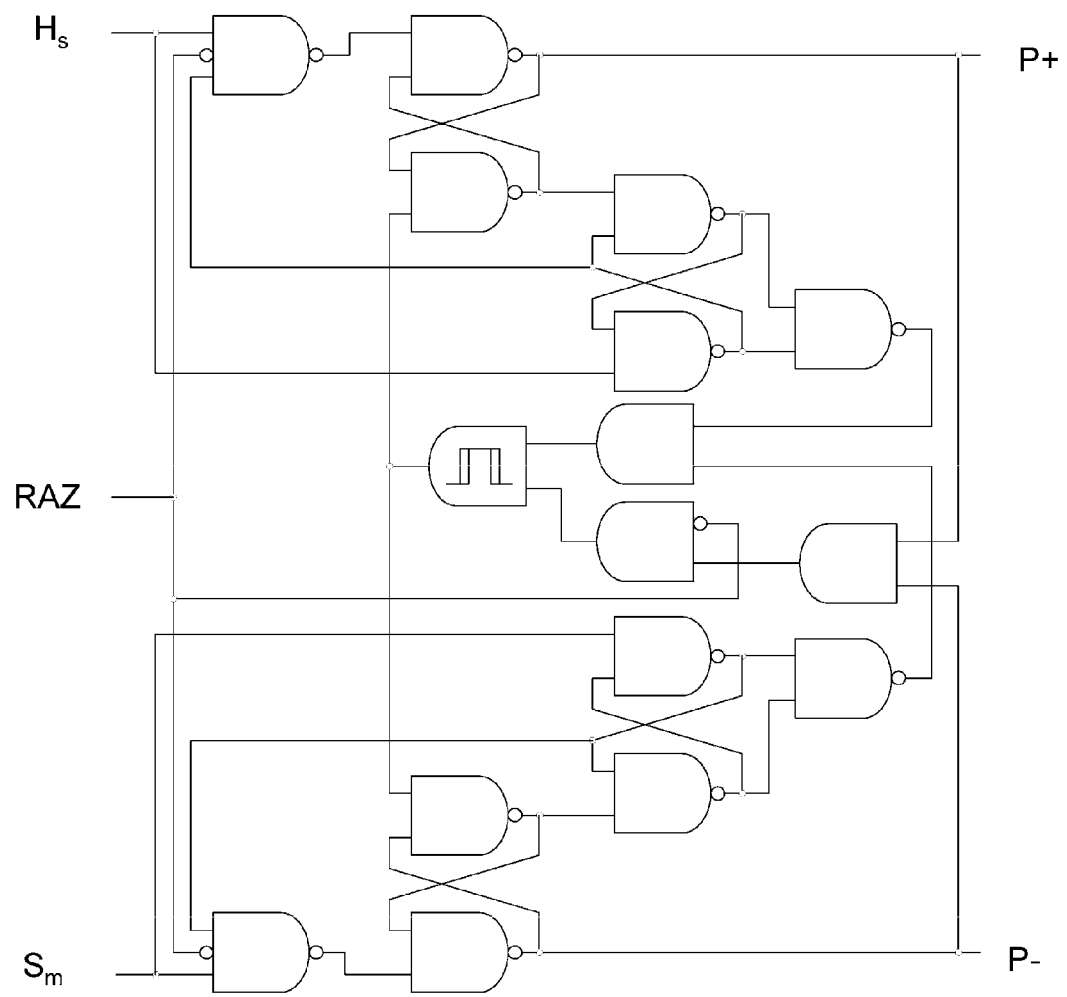
FIG. 8 represents an exemplary phase comparator.

FIG. 8 represents an example of a phase comparator that can be used in the demodulator according to the invention. It is a comparator which consists of a set of logic gates operating in asynchronous logic mode; it receives, on its inputs, the output $S_m$ of the delay line and the signal $H_s$ output from the frequency divider DIV in order to compare the phases of these two outputs.

The comparison is done on the rising edges of the input signals. The comparator has two outputs P+ and P− and produces on these outputs positive pulses whose start and end depend on the relative position of the rising edges on the two inputs of the comparator. For example, if the rising edge of the signal $H_s$ is leading the edge of the signal from the output $S_m$, the pulse on P+ will start earlier than the pulse on P−.

It is these pulses which are used to supply an integrator producing, on a capacitor $C_{int}$, a control voltage $V_{ctrl}$ intended for the delay line. The integrator consists in this case of a charge pump, charging and discharging the capacitor $C_{int}$ by positive or negative current pulses which increase or reduce the voltage $V_{ctrl}$ according to the phase shift observed. If the positive pulses are longer than the negative pulses, the capacitor is charged, otherwise it is discharged. The balance is achieved when the input signals are in phase with one another, the phase comparator then periodically supplying a short positive pulse and a short negative pulse both of equal durations, which are compensated and which maintain the voltage at the terminals of the capacitor at its balance value.

Figure 9:
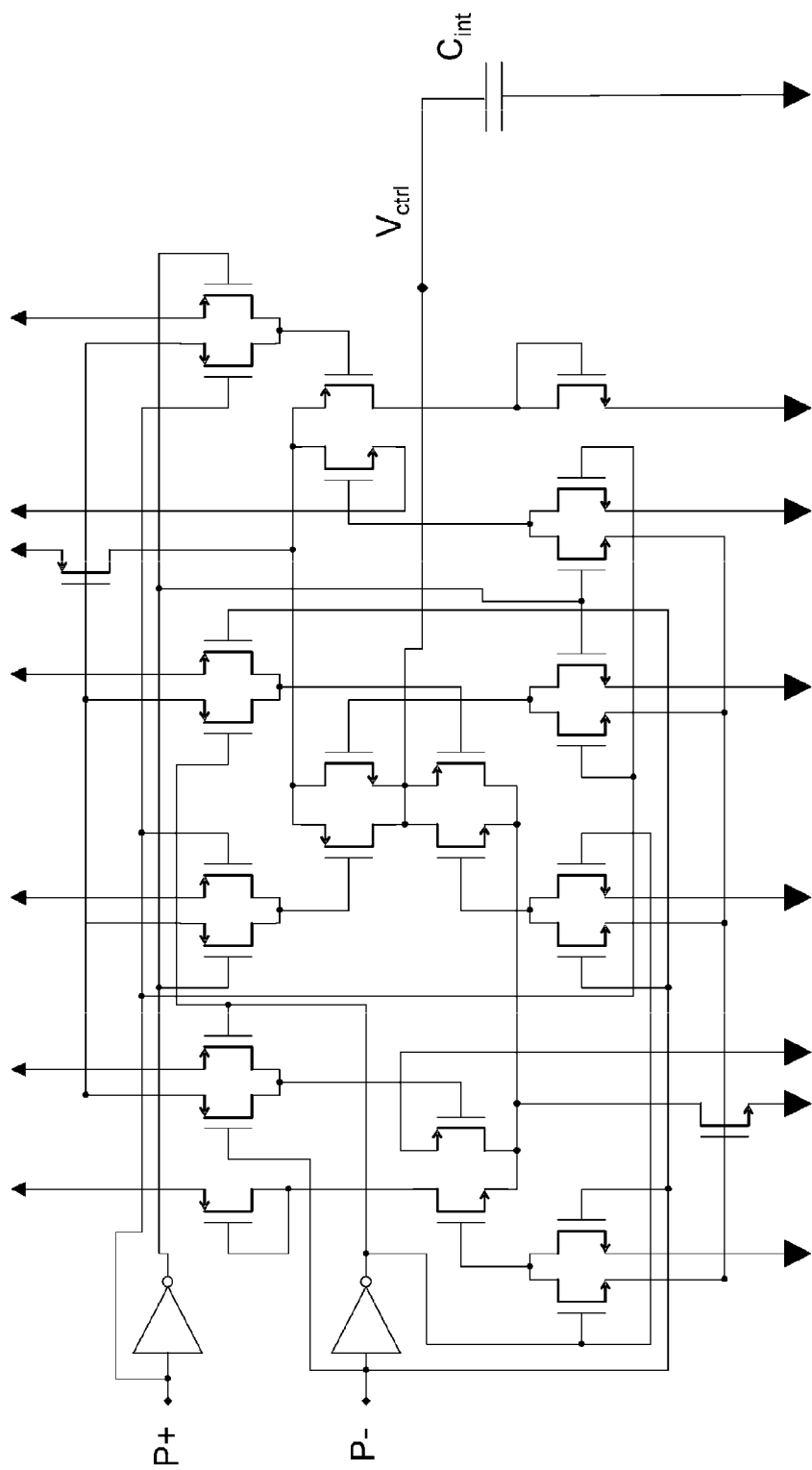
FIG. 9 represents an exemplary charge pump.

FIG. 9 represents a possible embodiment of the charge pump, conventional charge pump schemes also being able to be used in place of this scheme.

The pulses P+ and P− from the phase comparator are applied to the two inputs of the charge pump and the charge pump produces positive and negative currents which are respectively a function of the widths of the pulses on P+ and on P−, one of the currents charging the integration capacitor $C_{int}$ and the other discharging this capacitor.

Figure 10:
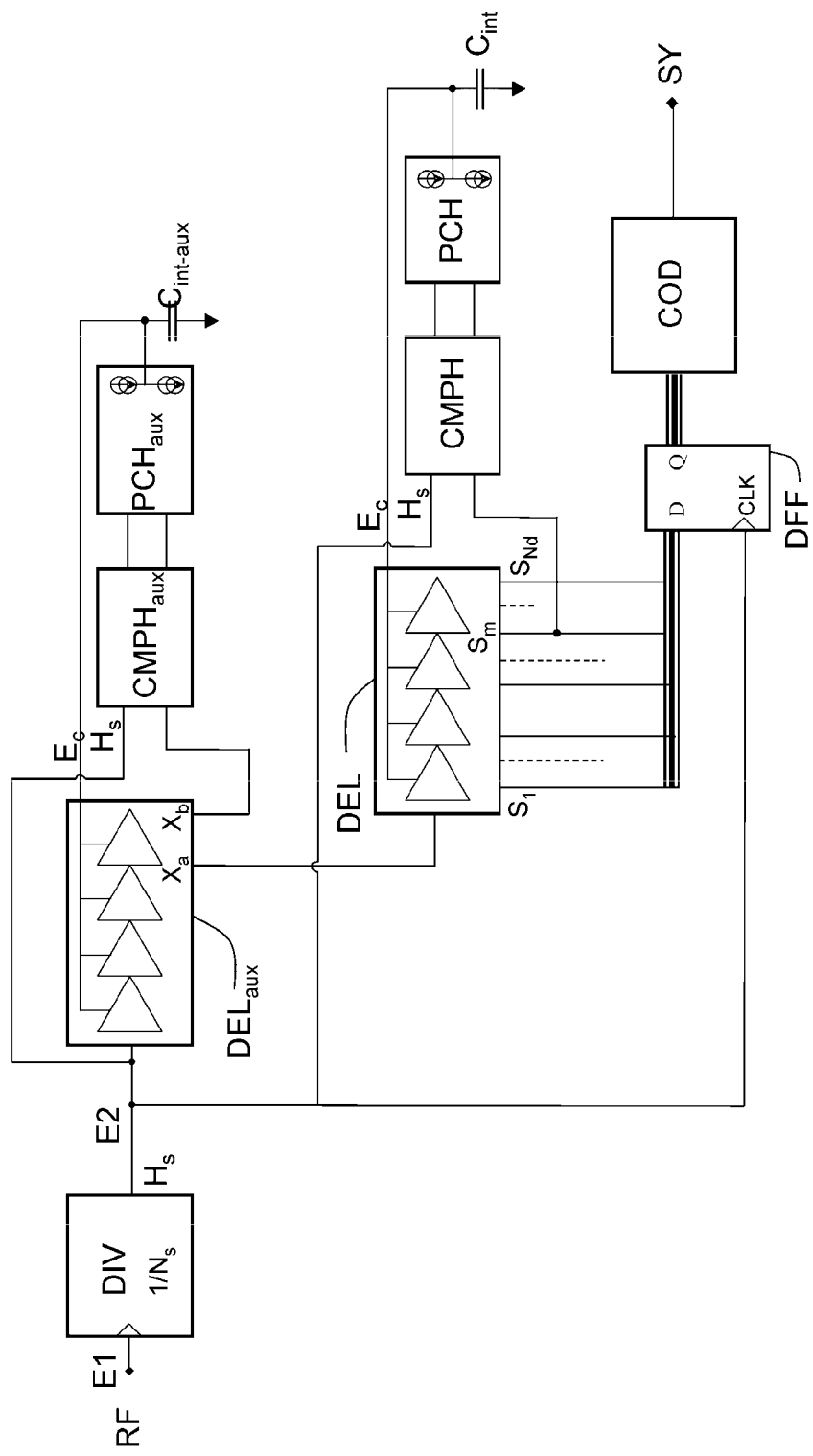
FIG. 10 represents a variant embodiment of the demodulator, with an auxiliary delay line upstream of the delay line.

FIG. 10 represents a variant embodiment of the demodulator, using an auxiliary delay line upstream of the line already described. This variant is useful for reducing the number of outputs of the delay line DEL in certain cases and notably in the case where the number $N_s$ is higher than 2 or 4, or even when the number of possible symbols is high. This is because, for example in the case where $N_s$ is high, it is necessary to produce both a high average delay on the output $S_m$ (delay of an entire period of the signal $H_s$ therefore $N_s$ times the duration of a period of the RF signal) and at the same time low value delay increments $\Delta T$ between the different outputs to be able to distinguish the different symbol durations. In this case, it is preferable to use an auxiliary delay line $DEL_{aux}$ supplying a signal that is already delayed to the delay line DEL. The auxiliary delay line therefore establishes a main delay, and the line DEL establishes, from this main delay, the $N_d$ successive increments $\Delta T$ necessary for the demodulation. The main delay is chosen according to the minimum duration for which a measurement is required. Typically, if the modulation is a frequency modulation around a frequency $N_s/F_0$, resulting in signal $H_s$ periods ranging from $N_s/F_{max}$ to $N_s/F_{min}$, a main delay will be chosen that is equal to $N_s/F_{max}$ for the delay line $DEL_{aux}$.

The auxiliary delay line $DEL_{aux}$ therefore has an output $X_a$ which supplies the signal $H_s$ delayed by the main delay, and the delay line DEL still has $N_d$ outputs which establish delays which are incremented by $\Delta T$ relative to this main delay. The output $S_m$ preferably supplies, as in the embodiment of FIG. 2, a signal whose rising edges are in phase with those of the signal $H_s$ for the average modulation frequency $F_0$. The line $DEL_{aux}$ is preferably also locked onto this average modulation frequency $F_0$, the locking being done in the same way as for the line DEL; to this end, the line $DEL_{aux}$ preferably has another delayed output $X_b$ whose rising edges are substantially synchronous with the rising edges of $H_s$ for the average frequency $F_0$, and it is this output $X_b$ which is used to lock the delays of the auxiliary line $DEL_{aux}$ in the same way as the output $S_m$ is used to lock the line DEL. The locking loop of the line $DEL_{aux}$ therefore comprises a phase comparator $CMPH_{aux}$ receiving the signal $H_s$ and the output $X_b$, a charge pump $CHP_{aux}$ receiving the outputs of the phase comparator, and an integration capacitor $C_{int-aux}$ which integrates the output of the charge pump with a time constant very much greater than the duration of the modulation symbols.

With the scheme of FIG. 10, if a delay value equal to $N_s/F_0-N_d\cdot \Delta T/2$ is taken as the main delay established by the line $DEL_{aux}$, the delay line DEL will establish $N_d$ successive delays of value $\Delta T$ from this main delay, so that the set of the delays established by the line DEL will range from a delay $N_s/F_0-N_d\cdot \Delta T/2$ to a delay $N_s/F_0+N_d\cdot \Delta T/2$, allowing for the measurement of symbols of durations corresponding to this interval with a resolution $\Delta T$.

The delay line $DEL_{aux}$ does not need to have numerous stages like the line DEL, but its stages establish delays greater than $\Delta T$.

Figure 11:
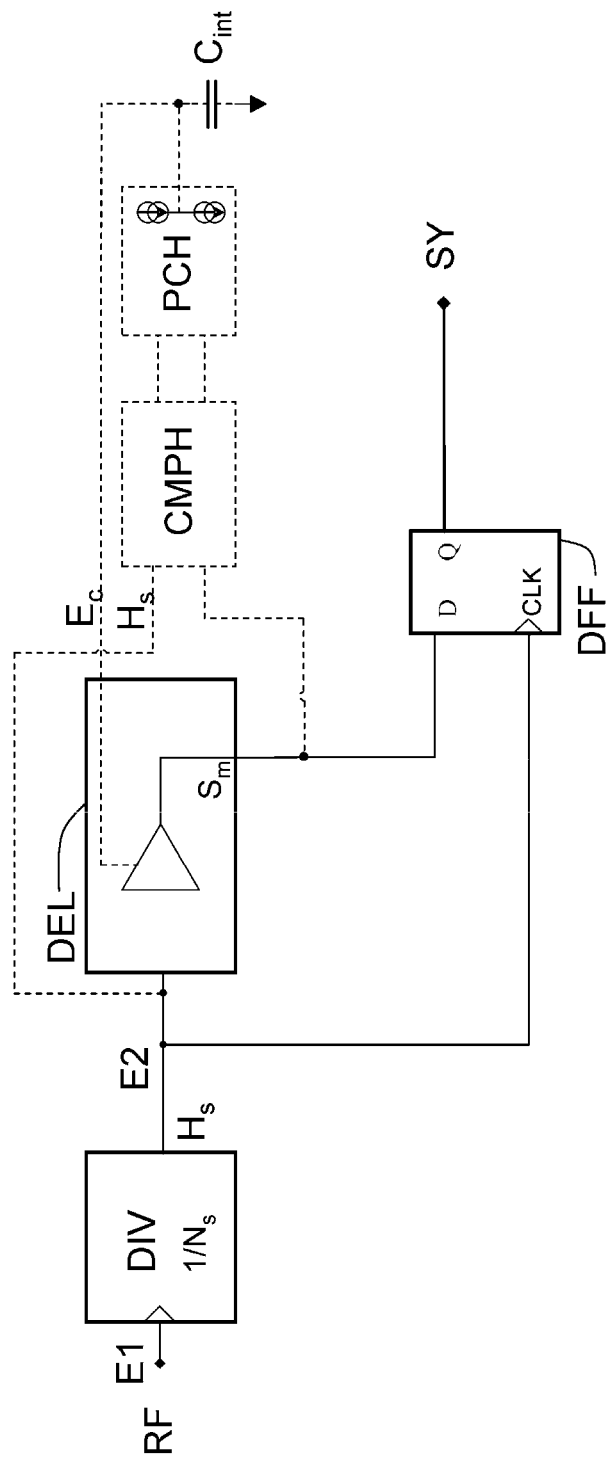
FIG. 11 represents a demodulator according to the invention in the particular case where $N_d=1$.

FIG. 11 represents an embodiment in which $N_d$ is equal to 1. This embodiment makes it possible to demodulate a series of symbols that have only two possible states but it has the advantage of a very great simplicity and of a very low bulk in an integrated circuit chip. It operates like the preceding embodiments in frequency modulation or phase modulation mode. In frequency modulation mode, the frequencies of the radiofrequency signal RF corresponding to the two symbols to be demodulated are respectively $F_1$ and $F_2$ such that $N_s/F_1=T_0+\Delta T$ and $N_s/F_2=T_0-\Delta T$, the average frequency being $F_0=N_s/T_0$. It will be noted that, with $N_d=1$, it is not possible to have any symbol represented by the average frequency $F_0$. In phase modulation mode, the symbols to be demodulated also correspond to durations $T_0+\Delta T$ and $T_0-\Delta T$, these different durations resulting from the phase jumps of the signal at the radiofrequency (frequency $F_0$) at the moment of the transitions between symbols. For a phase jump of $\pi/2$ for example, $\Delta T$ is equal to $T_0/4N_s$ (a quarter period of the signal at the radiofrequency). It will be noted that a phase jump of $\pi$ is not possible, if $N_s=1$.

The demodulator includes a frequency divider which divides the frequency of the input signal by an integer number $N_s$, but, as has been explained previously, only in the case where $N_s$ is greater than 1, that is to say, in the case where the duration of a symbol is several ($N_s$) periods (or average periods) of the radiofrequency signal RF.

The core of the demodulator, after the divider DIV, comprises a delay line which has only a single output $S_m$ (or with only a single output used), and it also includes a single latch D whose input D receives the output $S_m$ of the delay line and whose clock input CLK receives the input signal $H_s$ at the frequency $F/N_s$. On the rising edge (for example) of the signal $H_s$, the latch takes the state imposed on its input D. This state depends on the instant of arrival on the clock input CLK of a second rising edge of $H_s$ after a first rising edge which has been delayed on the output $S_m$.

The delay on the output $S_m$ is preferably by an average period $T_0$ of the signal $H_s$. It could be a half-period if the falling edges of the signal $H_s$ are used to control the clock input CLK of the latch.

For a symbol of duration $T_0+\Delta T$ delayed by $T_0$ (or $T_0/2$), the state of the latch takes a first binary value representing this symbol; for a symbol of duration $T_0-\Delta T$ it takes an inverse binary value representing this symbol.

If the circuit is to be simplified as much as possible, a fixed delay line is used which supplies a delay equal to the expected average period or half-period $T_0$ or $T_0/2$. Otherwise, the same method can be used as in the embodiments described previously in which the delay locked is locked onto the average frequency of the received signal by assuming that, over a fairly long time constant, as many symbols of duration $T_0+\Delta T$ as symbols of duration $T_0-\Delta T$ will be received. In this case, a phase-locked loop, represented in dotted lines in FIG. 11 and identical to the one described previously, is used; it receives on one side the input signal $H_s$ and on the other the signal on the output $S_m$.

Given that there is only a single delay line and a single latch, it is desirable for the difference between the two frequencies $F_1$ and $F_2$ representing the two symbols to be demodulated to be sufficient for the rising or falling edges of the signal $H_s$, which control the input CLK of the latch, not to be too close to the rising or falling edges of the signal delayed by T0, otherwise errors could occur. Values such that the periods corresponding to the two symbols are respectively $T_0+\Delta T$ and $T_0-\Delta T$ in which $\Delta T$ is between 15% and 35% of $T_0$ are ideal. The ratio $F_2/F_1$ between the two radiofrequencies used in the modulation is then between approximately 1.3 and 2. The delay line can be produced from the scheme of FIG. 7, in which only a single output corresponding to a delay $T_0$ or $T_0/2$ will be used.

The invention claimed is:

1. A demodulator comprising:
   a delay line adapted for receiving an input signal at an input frequency, phase or frequency modulated by symbols with a duration substantially equal to or equal to a period of the input signal, the delay line having $N_d$ outputs producing $N_d$ signals at the input frequency but with $N_d$ different delays, $N_d$ being an integer number greater than or equal to 1; and
   a register of $N_d$ latches each receiving a respective output of the delay line and a clock signal which is the input signal, said $N_d$ latches adapted to store a state of the outputs of the delay lines at the end of a period of the clock signal in the register, a content of the register representing a value of an input signal modulation symbol, wherein the delay line has a delay controlled by a locked loop, said locked loop comprising:
      a phase comparator receiving the input signal, phase or frequency modulated by the symbols, and one of the outputs of the delay line; and
      an integrator with a time constant greater than the duration of the symbols, receiving an output of the phase comparator and producing a delay line locking signal to lock the delays of the delay line according to an average value of the input frequency of the input signal, phase or frequency modulated by the symbols.

2. The demodulator according to claim 1, further comprising, upstream of the delay line, a frequency divider configured to divide a received frequency by an integer number $N_s$, said frequency divider adapted for receiving a signal at a phase or frequency modulated radiofrequency and for supplying the input of the delay line with said input signal, wherein said input signal has a frequency which is $N_s$ times lower than the radiofrequency.

3. The demodulator according to claim 1, wherein said delay line comprises, in series, a first delay line and an auxiliary delay line ($DEL_{aux}$) placed upstream of the first delay line, said auxiliary delay line receiving the input signal at the input frequency ($H_s$) and supplying a delayed signal to the first delay line.

4. The demodulator according to claim 3, wherein the first delay line and the auxiliary delay line are each controlled by respective locked loops.

5. The demodulator according to claim 1, wherein $N_d$ is greater than 1 and the $N_d$ different delays are offset by a common duration $\Delta T$ relative to one another.

6. The demodulator according to claim 1, wherein $N_d=1$, and the delay line supplies a delayed signal to an input of a single latch, the single latch having a clock input receiving the input signal and having an output supplying a binary value representing one out of two modulation symbols.

7. The demodulator according to claim 6, wherein the delay established by the delay line is an average period or a half-period of the input signal.

8. A system for transmitting information between a reader and a radiofrequency identification tag, comprising a demodulator in the tag, the demodulator comprising:
   a delay line adapted for receiving from said reader an input signal at an input frequency, phase or frequency modulated by symbols with a duration substantially equal to or equal to a period of the input signal, the delay line having $N_d$ outputs producing $N_d$ signals at the input frequency but with $N_d$ different delays, $N_d$ being an integer number greater than or equal to 1; and
   a register of $N_d$ latches each receiving a respective output of the delay line and a clock signal which is the input signal, said latches adapted to store the state of the outputs of the delay lines at the end of a period of the clock signal in the register, the content of the register representing a value of an input signal modulation symbol, wherein the delay line has a delay controlled by a locked loop, said locked loop comprising:
      a phase comparator receiving the input signal, phase or frequency modulated by the symbols, and one of the outputs of the delay line; and
      an integrator with a time constant greater than the duration of the symbols, receiving an output of the phase comparator and producing a delay line locking signal to lock the delays of the delay line according to an average value of the input frequency of the input signal, phase or frequency modulated by the symbols.

9. The system for transmitting information according to claim 8, wherein the reader is adapted for sending a frequency or phase modulated radiofrequency signal.

10. The system for transmitting information according to claim 9, wherein the reader is adapted for sending information in the form of symbols whose duration is equal to an integer number $N_s$, $N_s$ being greater than or equal to 1, the duration being that of successive periods of the modulated radiofrequency signal.

11. The system for transmitting information according to claim 9, wherein the reader is adapted for sending information in the form of symbols whose duration is equal to an integer number $N_s$, $N_s$ being greater than or equal to 1, of times an average period of the radiofrequency signal.

12. A demodulator comprising:
   a delay line adapted for receiving an input signal at an input frequency, phase or frequency modulated by at least three different symbols with a duration substantially equal to or equal to a period of the input signal, the delay line having $N_d$ outputs producing $N_d$ signals at the input frequency but with $N_d$ different delays, $N_d$ being an integer number at least equal to 3;
   a register of $N_d$ latches each receiving a respective output of the delay line and a clock signal which is the input signal, said $N_d$ latches adapted to store a state of the outputs of the delay lines at the end of a period of the clock signal in the register, a content of the register representing a value of an input signal modulation symbol in thermometric coding; and
   a coder connected to outputs of the $N_d$ latches configured to provide a demodulated signal among said at least three different symbols from the outputs of the $N_d$ latches.

13. The demodulator of claim 12, wherein the delay line is configured to have a delay duration that is fixed from one symbol to the next.

14. The demodulator of claim 12, wherein the delay line has a delay controlled by a locked loop, said locked loop comprising:
   a phase comparator receiving the input signal and one of the outputs of the delay line; and
   an integrator with a time constant greater than the duration of the symbols, receiving an output of the phase comparator and producing a delay line locking signal to lock the delays of the delay line according to an average value of the input frequency.

15. The demodulator of claim 12, further comprising, upstream of the delay line, a frequency divider configured to divide-a received frequency by an integer number $N_s$, said frequency divider adapted for receiving a signal at a phase or frequency modulated radiofrequency and for supplying the input of the delay line with said input signal, wherein said input signal has a frequency which is $N_s$ times lower than the radiofrequency.

16. The demodulator according to claim 12, wherein said delay line comprises, in series, a first delay line and an auxiliary delay line placed upstream of the first delay line, said auxiliary delay line receiving the input signal at the input frequency ($H_s$) and supplying a delayed signal to the first delay line.

17. The demodulator according to claim 16, wherein the first delay line and the auxiliary delay line are each controlled by respective locked loops.

* * * * *